United States Patent [19]
Georgoudis et al.

[11] 3,975,323
[45] Aug. 17, 1976

[54] COPOLYESTERS, METHOD OF MANUFACTURING SAME, AND HOT MELT ADHESIVE COMPOSITIONS INCORPORATING SAME

[75] Inventors: Paul C. Georgoudis, Dunellen; Jules E. Schoenberg, Scotch Plains; Dilip K. Ray-Chaudhuri, Somerville; Paul P. Puletti, Glen Gardner, all of N.J.

[73] Assignee: National Starch and Chemical Corporation, Bridgewater, N.J.

[22] Filed: Jan. 21, 1975

[21] Appl. No.: 542,692

[52] U.S. Cl.............................. 260/22 D; 260/7.5; 260/47 UA; 260/75 UA
[51] Int. Cl.²........................................ C08L 91/00
[58] Field of Search ........ 260/22 D, 47 EA, 75 UA, 260/7.5 R

[56] References Cited
UNITED STATES PATENTS

| | | | |
|---|---|---|---|
| 3,033,822 | 5/1962 | Kibler | 260/47 |
| 3,158,584 | 11/1964 | Laymon | 260/22 D |
| 3,235,520 | 2/1966 | Crowell | 260/22 D |
| 3,390,108 | 6/1968 | Keck | 260/7.5 |

Primary Examiner—Lewis T. Jacobs
Assistant Examiner—William E. Parker

[57] ABSTRACT

A copolyester is formed of at least one symmetrical aromatic dicarboxylic acid member, at least one dimer acid, and at least one $C_2$—$C_{10}$ glycol, and at least one polyester polyol member. The polyester polyol member is either a polycaprolactone polyol having a molecular weight of 500–5,000, or a mixture of a polycaprolactone diol having a molecular weight of 300–5,000 and a nonpolymeric polyol. The resultant thermoplastic copolyester has a glass transition temperature of less than 25°C and a polymer melting temperature greater than 70°C, and is useful both as a hot melt adhesive by itself and as an ingredient of both pressure sensitive and non-pressure sensitive hot melt adhesive formulations. In producing the copolyester, an intermediate copolyester of the symmetrical aromatic dicarboxylic acid member, the dimer acid, and the glycol is chain extended by reaction with the polyester polyol member in a 2–6 hour reaction at about 225°–270°C under a vacuum of about 1–30 mm. Hg. pressure.

23 Claims, No Drawings

COPOLYESTERS, METHOD OF MANUFACTURING SAME, AND HOT MELT ADHESIVE COMPOSITIONS INCORPORATING SAME

BACKGROUND OF THE INVENTION

This invention relates to novel copolyesters and hot melt adhesives formed therefrom.

Various problems have been associated with the use of adhesives for plasticized vinyl substrates such as vinyl wall coverings, vinyl tile, edge banding and other vinyl laminations. For instance, over a period of time the plasticizers from the highly plasticized vinyl substrate tend to migrate to the adhesive/substrate interface, and even into the adhesive itself. Attack of the adhesive interface by the plasticizer results in a rapid loss in adhesion, and attack of the adhesive itself by the plasticizer results in a loss of cohesion or internal strength of the adhesive, accompanied by splitting and transfer.

Conventional hot-melt pressure sensitive adhesives such as ethylene/vinyl acetate copolymers and rubber based adhesives are rapidly attacked by the migrating plasticizers from the vinyl substrate resulting in a decrease in the tensile peel values of the adhesive bond to very low levels and a loss of cohesive strength of the adhesive. Accompanying the migration of plasticizer from the vinyl substrate is a rapid shrinkage of the vinyl substrate by as much as 5 to 10%. While the acceptable degree of vinyl shrinkage or decrease in peel strength will, of course, vary with the application, typical requirements for the pressure sensitive adhesives utilized in connection with vinyl substrates are a 40–150 ozs./linear inch peel strength (or bond value) with less than a 30% decrease after aging for one week at 70°C, and less than 0.5% vinyl shrinkage, with no adhesive splitting or transfer, after similar aging. Additional requirements for a hot melt pressure sensitive adhesive in general are good thermal stability (i.e., the ability to resist degradation or gelation at high temperature), good wetting characteristics, low melt viscosity, and compatibility with a large variety of tackifying resins, modifiers, pigments and the like; in some instances, it is furthermore desirable that these adhesives be applicable to a substrate from a solution. Additional requirements for a hot melt non-pressure sensitive adhesive in general are high heat resistance (i.e., the ability to form an adhesive bond which withstands high temperatures) and cold resistance (i.e., the ability to form an adhesive bond which withstands low temperatures).

Copolyesters of ethylene glycol, terephthalic acid and dimer acid and similar copolyesters have been described in various patents such as U.S. Pat. Nos. 3,383,343; 3,390,108; 3,329,740 and French Pat. No. 1,398,551. Such copolyesters have not proven to be especially useful as adhesives for vinyl substrates despite their low shrinkage levels, because they are not highly resistant to plasticizer migrating from the vinyl substrate. Typically the peel strength decreases by at least 50% on aging, with accompanying adhesive transfer and splitting. Attempts to improve the adhesive properties of such copolyesters by chain extending the copolyesters with various non-polymeric polyols such as trimethylol propane and various polyether polyols such as trimethylol propane/ethylene oxide adducts have not proven successful. Another feature inhibiting the use of such polyesters has been the cost and difficulty in manufacturing. In conventional polyester manufacture, high temperatures (up to 280°C), high vacuum (1.0–0.1 mm Hg) and long polycondensation times are required to obtain products exhibiting useful adhesive characteristics. Such extreme conditions do not always result in the best obtainable products due to degradation reactions occurring during polycondensation, and of course increase the cost of manufacture.

Accordingly it is an object of the present invention to provide a novel copolyester which is a high molecular weight chain-extended aromatic dicarboxylic acid/dimer acid/glycol copolyester useful as a hot melt adhesive.

Another object is to provide such an adhesive which inhibits shrinking of a vinyl substrate and is resistant to plasticizer migrating from the vinyl substrate.

A further object is to provide such an adhesive exhibiting a 40–150 ounces/linear inch peel strength with a maximum 30% decrease in strength after aging and a maximum 0.5% shrinkage of the vinyl substrate with no adhesive splitting or transfer after aging.

It is also an object to provide for pressure sensitive applications such an adhesive exhibiting good thermal stability, good wetting characteristics, low melt viscosity, and a high compatibility with a large variety of tackifying resins, modifiers, pigments, etc.

It is another object to provide for non-pressure sensitive applications such an adhesive exhibiting high heat and cold resistance.

It is a further object to provide a method of manufacturing such polyesters under very mild conditions involving temperatures no higher than 270°C, pressures of 1–30 mm Hg and relatively short polycondensation times of 2–6 hours.

SUMMARY OF THE INVENTION

It has now been found that the above and related objects of the present invention are provided by a copolyester of at least one aromatic dicarboxylic acid member, at least one dimer acid, at least one $C_2$–$C_{10}$ glycol, and at least one polyester polyol member utilized as a chain extender. The aromatic dicarboxylic acid member is a symmetrical aromatic dicarboxylic acid or an acid functioning derivative thereof, and is preferably terephthalic acid or dimethyl terephthalate. The dimer acid is preferably a dimerized unsaturated fatty acid, a hydrogenated derivative thereof, or an acid-functioning derivative of either; and the $C_2$–$C_{10}$ glycol is preferably 1,4-butanediol or 1,6-hexanediol.

The chain extending polyester polyol member is either a polycaprolactone polyol having a molecular weight of from about 500 to about 5,000 and a functionality greater than 2, or a mixture of a polycaprolactone diol having a molecular weight of from about 300 to about 5,000 and a non-polymeric polyol having a functionality greater than 2. The polycaprolactone polyol is present in an amaount from about 1 to about 6 mole percent of the total discarboxylic acid members in the copolyester, and the polycaprolactone diol and the non-polymeric polyol are each present in the mixture in an amount from about 1 to about 6 mole percent of the total dicarboxylic acid members in the copolyester.

The thermoplastic copolyesters of the present invention are characterized by a melting temperature greater than 70°C and a glass transition temperature less than 25°C, and are prepared by forming an intermediate copolyester of the aromatic dicarboxylic acid member, the dimer acid and the $C_2$–$C_{10}$ glycol, and chain extending the intermediate copolyester by reaction thereof with the polyester polyol member for about 2–6 hours at about 225°–270°C in a vacuum of about 1–30 mm Hg pressure.

The copolyesters thus produced are hot melt adhesives which may be compounded in various ways to lend themselves either to pressure sensitive adhesive formulations useful for vinyl wall coverings, labels, decals and the like, or to non-pressure sensistive adhesive formulations useful as structural adhesives and for packaging, edge banding and laminating paper, cloth, wood, etc. Suitable tackifying resins for the polyesters include rosins and rosin esters; aromatic hydrocarbon resins such as styrene polymers and copolymers; coumarone-indene resins; aromatic-aliphatic copolymer resins; aromatic petroleum oils; and phenolic polymer and copolymer resins. Additionally, conventional modifiers, extenders, antioxidants, ultraviolet stabilizers, plasticizers and pigments may be included in the formulation as desired for particular applications.

DETAILED DESCRIPTION OF THE PREFERRED EMBODIMENTS

The copolyesters of the present invention are prepared from at least one aromatic dicarboxylic acid member, at least one dimer acid, at least one $C_2$–$C_{10}$ glycol, and at least one polyester polyol member.

In discussing the composition and preparation of the copolyester, the term "polyol" will be restricted to compounds having a hydroxyl functionality greater than 2, while the term "diol" will be restricted to compounds having a hydroxyl functionality of exactly 2, thus making the terms diol and polyol mutually exclusive. The term "total dicarboxylic acid members" includes both the aromatic dicarboxylic acid members and the dimer acid members.

The aromatic dicarboxylic acid member of the copolyester is a symmetrical aromatic dicarboxylic acid, such as terephthalic acid, naphthalene 1,5-dicarboxylic acid, etc., or an acid functioning derivative thereof, such as dimethyl terephthalate, etc. Due to its low cost relative to other members of the class and its ready availability in a relatively pure form, dimethyl terephthalate is a preferred member of the class. In determining the best aromatic dicarboxylic acid member for use in the copolyester, attention should be paid both to the symmetrical nature of the compound (to insure crystallinity within the copolyester) and to the melting point of the homopolymer of the member (to insure that the copolyester has a relative high melting point). Non-symmetrical aromatic dicarboxylic acids such as isophthalic acid are inoperative in the present invention, although they may be used in small amounts, in addition to the aromatic dicarboxylic acid member to modify the copolyester properties.

The dimer acid member of the copolyester is preferably a dimerized unsaturated fatty acid (such as dimerized oleic acid, linoleic acid, or linolenic acid), a hydrogenated derivative thereof, or an acid-functioning derivative of either. The dimer acid need not be of exceptional purity, and monomeric and trimeric acids may be present in small quantities, preferably not exceeding 5% by weight. If desired, the dimer acid member may be substantially freed of monomer and trimer fractions by molecular distillation or other suitable means. Dimer acids suitable for use in the present invention include those commercially available from Emery Industries, Inc. under the trade names EMPOL 1014 (unsaturated dimer acid) and EMPOL 1010 (a hydrogenated dimer acid), as well as those commercially available from the Humko Products Division of Kraftco under the trade name HYSTRENE, such as HYSTRENE 3695. The preparation and description of dimerized fatty acids is generally well known in the art and specifically described in J. A. C. S. 66, 84 (1944) and U.S. Pat. No. 2,347,562. The dimer acids exist in the copolyester as rubbery segments and accordingly dimer acids of relatively high molecular weight (preferably over 500) are preferred so that the copolyesters are resilient, but do not deform until relatively high temperatures are reached.

The glycol member of the copolyester has from 2 to 10 carbon atoms and may be 1,2-ethanediol (also called ethylene glycol), 1,4-butanediol, 1,6-hexanediol, 2,2-dimethyl-1,3-propanediol (also called neopentyl glycol), the 1,4-butanediol and 1,6-hexanediol being preferred. The aromatic dicarboxylic acid member and the glycol member tend to exist as co-reacted segments within the copolyester chain (for example, as polyethylene terephthalate segments) so that the copolyesters are to some extent block copolymers. Such aromatic dicarboxylic acid member/glycol member segments provide a degree of crystallinity to the copolyester, and these segments are preferably of rather high melting point. Accordingly, it is preferred that the glycol used in the copolyester be one whose homopolymer has a high melting point.

The polyester polyol member of the copolyester is either a polycaprolactone polyol having a molecular weight of from about 500 to about 5,000, or a mixture of a polycaprolactone diol having a molecular weight of from about 300 to about 5,000 and a non-polymeric polyol. The polycaprolactone polyol preferably has a molecular weight from about 500 to about 2,000 such as that sold by Union Carbide under the trade names NIAX POLYOL PCP 0300, PCP 0310, etc. The polycaprolactone diol of the mixture preferably has a molecular weight from about 300 to about 2,000, such as that sold by Union Carbide under the trade name NIAX POLYOL PCP 0210. The non-polymeric polyol of the mixture may be a triol such as glycerol or trimethylol ethane or even a polyol such as pentaerythritol having a greater number of hydroxyl functionalities.

The polyester polyol member of the copolyester chain extends the intermediate copolyester formed by the aromatic dicarboxylic acid member, the dimer acid and the glycol, producing a copolyester of relatively high molecular weight. It facilitates the manufacturing of the copolyester by permitting a copolyester of high molecular weight to be produced under very mild conditions; that is temperatures of 225°–270°C, pressures of 1–30 mm Hg and polycondensation periods of 2–6 hours. (As earlier noted, in the absence of the polyester polyol member, high molecular weight copolyesters useful for particular adhesive applications may not be formed under any conditions, while copolyesters useful for other applications will require relatively severe conditions such as high vacuum of 1.0–0.1 mm Hg, high temperatures up to 280°C and prolonged polycondensation periods.) The copolyesters thus formed exhibit low melt viscosity and good thermal stability, two important parameters for hot melt adhesives, as well as excellent wetting characteristics, good heat and cold resistance, and compatibility with a large variety of tackifying resins, modifiers, pigments, etc.

Us of the polyester polyol member further provides a copolyester which is particularly well suited for use with vinyl substrates, especially when compounded into an appropriate adhesive formulation, such formulations exhibiting a 40–150 ozs./linear inch peel strength with less than a 30% decrease after aging for one week at 70°C and less than 0.5% shrinkage of a vinyl substrate (with no adhesive splitting or transfer) after aging for one week at 70°C. By way of comparison, formulations based on similar copolyesters not containing the polyester polyol member (e.g., those using a non-polycaprolactone triol) exhibit a similarly low rate of shrinkage, but are not as resistant to plasticizer, the peel strength decreasing more than 50% on aging for one week at 70°C, with accompanying adhesive transfer and splitting. The improvement in the resistance to plasticizer by chain extension of the copolyester with the polyester polyol member is specific to copolyesters which have been chain extended with a polyester polyol member. Chain extension of an aromatic dicarboxylic acid member/dimer acid/glycol copolyester exclusively with polyether polyols, such as trimethylol propane/ethylene oxide adducts, or with non-polymeric polyols, such as trimethylol propane, does not result in a copolyester exhibiting the improved plasticizer resistance.

The mechanism by which the polyester polyol member contributes to plasticizer resistance and improved aging characteristics is not completely understood. It is believed that plasticizer migration from the vinyl substrate into the copolyester adhesive does occur with the adhesives of the present invention, but that the highly chain-extended copolymers are able to withstand the plasticizers without significant change in their properties. It is further believed that the crystallinity inherent in the copolyesters of the present invention play a significant part. It is for this reason that a symmetrical aromatic dicarboxylic acid member is used in formation of the copolyester. Additionally it is believed that the polarity inherent in the copolyesters of the present invention also plays a significant part. It is for this reason that the polyester polyol member is a polycaprolactone derivative.

All of the copolyesters of the present invention exhibit a low glass transition temperature $T_g$ (that is, the temperature at which the amorphous region of the crystalline polymer changes from a fluid to a glassy solid) and a high polymer melting point $T_m$ (that is, the temperature at which the crystals in the polymer begin to melt). These are significant properties for an adhesive as its heat resistance is generally a function of its polymer melting point and its cold resistance is generally a function of its polymer glass transition temperature. Thus the copolyesters of the present invention are tough, resilient, thermoplastic polymers having a glass transition temperature less than 25°C and a polymer melting point greater than 70°C.

The proportions of the various aromatic dicarboxylic acid members, fatty acid members and glycol members present in the copolyester of the present invention will vary according to the application intended for the copolyester. The aromatic dicarboxylic acid member combined with the glycol member provides heat resistance and strength; the dimer acid member combined with the glycol member provides resilience, toughness, tack and cold resistance. The polymer melting point will vary particularly with the choice of the glycol and aromatic dicarboxylic acid members, as well as the ratio of the aromatic dicarboxylic acid/dimer acid members. Where the glycol forms a relatively low melting polymer with the aromatic dicarboxylic acid member (for example, where 1,6-hexanediol is reacted with terephthalic acid), a higher ratio of the aromatic dicarboxylic acid/dimer acid members is required. Where the glycol forms a relatively high melting polymer with the aromatic dicarboxylic acid member (for example, 1,4-butanediol and terephthalic acid), a lower ratio of aromatic dicarboxylic acid/dimer acid members is preferred to retain resilience in the copolyester and minimize its brittleness.

While the copolyesters of the present invention are useful by themselves as adhesives without being modified in any way, it is often advantageous and even necessary to blend in other components for particular adhesive applications. For example, tackifying resins will typically be incorporated into the copolyester composition, the particular tackifying resin and the quantity thereof being determined by the specific product desired and/or the application desired. Exemplary of such tackifying resins are the rosins and rosin esters (such as those available from Hercules Chemical Company under the trade name FORAL), aromatic hydrocarbon resins including styrene polymers and copolymers (such as the low molecular weight polystyrene resins available from Hercules Chemical Co. under the trade names PICCOLASTIC and KRISTALEX RESINS) and α-methylstyrene/vinyltoluene resins (available from Hercules Chemical Co. under the trade name PICCOTEX), the coumarone-indene resins (such as those available from Neville Chemical Co. under the trade name NEVILLAC and from Hercules Powder Co. under the trade name PICCO L), aromatic-aliphatic copolymer resins (such as those available from Velsicol Chemical Corp. under the trade name KLYVEL), aromatic petroleum oils (such as those available from Shell Chemical Co. under the trade name SHELLFLEX), phenolic polymer and copolymer resins (such as those available from Schenectady Chemical, Inc. under the trade name RESIN SP), and the like. Additionally, various other modifiers including antioxidants (such as 4,4-thiobis-(6-tertiary butyl metacresol) available from Monsanto Chemical Co. under the trade name SANTONOX R, others available from Weston Chemical Company under the trade name WESTON PHOSPHITE or still others available from Ciba-Geiggy under the trade name IRGANOX), plasticizers (such as dioctyl phthalate), pigments (such as calcium carbonate, silicon dioxide, titanium dioxide, zinc oxide), modifiers (such as styrene/butadiene copolymers, styrene/isoprene copolymers, ethylene/vinyl acetate copolymers), inert fillers (such as barium sulfate), and materials to increase bonding speeds (such as the hydrogenated caster oil available from Baker Caster Oil Co. under the trade name CASTOR WAX).

The copolyesters of the present invention are formed in the following manner. Typically the aromatic dicarboxylic acid member and the glycol member are reacted at elevated temperatures (up to 220°C) in the presence of a catalyst until the theoretical yield of the condensation or ester interchange product liberated is distilled off. The desired quantity of dimer acid member is then added along with an entraining agent, such as xylene, and heating is continued under reflux at about 225°C until the theoretical yield of water formed as a result of the condensation reaction of the dimer acid is distilled off. (Alternatively, the aromatic dicarboxylic acid member, the glycol member and the dimer acid may be introduced into the reaction vessel simultaneously and co-reacted.) After the water is distilled off, the polyester polyol member is introduced into the reaction vessel, the pressure is gradually reduced to about 1–30 mm Hg, and the ingredients are heated to and maintained at about 225°–270°C for about 2 to 6 hours. The product of this chain-extending polycondensation reaction may be conveniently discharged from the reaction vessel into a silicone release coated container.

Various catalysts can be used in connection with the various reactions. For example, the first condensation reaction between the aromatic dicarboxylic acid member and the glycol member may be catalyzed by individual catalysts such as antimony trioxide, litharge, glycol soluble compounds of titanium or cobalt, zinc acetate, lead acetate, or manganese acetate, or by combination catalysts such as lead acetate/litharge or dibutyltin oxide/antimony trioxide, or by any of the other conventional polyesterification catalysts. Similarly the second condensation reaction of the first product and the remaining glycol with the dimer acid member may be catalyzed by the same or different catalysts. Antioxidants may be added at various stages of the reaction, preferably a small amount in the initial mix and a larger amount being added shortly before discharge of the product. The various tackifying resins, ultraviolet stabilizers, fillers and the like may be added in conventional quantities and according to conventional procedures, as desired. When used, the tackifying resin will be present in amounts up to 75%, preferably not more than 55%, by weight of the total adhesive composition including the tackifying resin. Useful fillers (extenders and pigments) include for example, silica, barium sulfate, calcium carbonate and zinc oxide, and these can be used in amounts up to 50% by weight of the total adhesive composition including the filler. Various waxes, such as paraffin, microcrystalline and synthetic waxes, may also be included in these adhesives in amounts up to about 50% by weight of the total adhesive composition including the wax.

Exemplary of the efficacy of the products and processes of the present invention are the following examples in which all parts are by weight unless otherwise specified.

EXAMPLE I

This example illustrates typical preparations of copolyesters of the present invention for pressure sensitive applications using the ingredient additions of Table I.

A 2-liter 4-neck flask was equipped with mechanical stirrer, thermometer, nitrogen inlet, 9 inch stainless steel packed Goodloe column, 20 ml distillation receiver and condenser. Addition A was introduced and heated (by means of a heating mantle and variable transformer) to a maximum temperature of 205°C until the theoretical yield of methanol was distilled off (2.5hrs.). Thereafter, Addition B was introduced into the reaction flask, and the reaction continued at 220°C under reflux until the theoretical yield of water was distilled off and the product had an Acid No. = 0.9 (mg KOH/g. sample). Then Addition C was introduced into the reaction flask and the pressure was then gradually reduced to 14 mm Hg (by means of a water aspirator), while the ingredients were heated to and kept at 260°C for about 3.75 hours. Finally, Addition D was mixed into the flask for about 5 minutes before discharging of the mix onto a silicone release paper. The product was tested with the results indicated in Table I.

A copolyester of identical composition to Copolyester I(a), but without the polyester polyol member, prepared under the same conditions had similar glass transition and polymer melting point temperatures, but an intrinsic viscosity of 0.54 deciliters/gram even when very low pressures (1.0 – 0.1 mm Hg) were used.

In Copolyester I(b), the initial alcoholysis step (terephthalic acid ester and glycol) was eliminated and instead the terephthalic and dimer acids were reacted directly with the glycol. In Copolyester I(e) the polycaprolactone polyol was added initially rather than during polycondensation; the product was slow to crystallize and formed satisfactory adhesive bonds only after aging for several days at room temperature.

EXAMPLE II

This example illustrates a variety of ways in which a copolyester of the present invention can be formulated in a pressure sensitive adhesive formulation using various tackifying resins.

In each instance the following formulation was used:

TABLE I

| Formulations | I(a) | I(b) | I(c) | I(d) | I(e) |
|---|---|---|---|---|---|
| Addition "A" | | | | | |
| Dimethyl terephthalate | 181.0 | | 253.5 | 226.5 | 177.5 |
| Terephthalic acid | | 155.0 | | | |
| Empol 1010 dimer acid | | 512.0 | | | |
| 1, 4-Butanediol | 257.0 | 257.0 | 360.0 | 321.0 | 252.0 |
| Dibutytin oxide (catalyst) | 0.48 | 0.48 | 0.68 | 0.60 | 0.47 |
| Antimony trioxide (catalyst) | 0.19 | 0.19 | 0.27 | 0.24 | 0.19 |
| Antioxidant | 0.38* | 0.38** | 0.54** | 0.50** | 0.38** |
| NIAX POLYPOL PCP 0300 (triol) | | | | | 27.9 |
| Addition "B" | | | | | |
| EMPOL 1010 dimer acid | | | | | |
| EMPOL 1014 dimer acid | 514.0 | | | 640.0 | 501.0 |
| HUMKO 3695 dimer acid | | | 716.0 | | |
| Xylene | 86.0 | | | | |
| Addition "C" | | | | | |
| NIAX POLYOL PCP 0300 (triol) | 28.5 | 28.5 | 39.8 | | |
| NIAX POLYOL PCP 0210 (diol) | | | | 35.8 | |
| Trimethylolpropane | | | | 8.9 | |
| Addition "D" | | | | | |
| Antioxidant | 2.4* | 2.40** | 3.40** | 2.84** | 2.34** |
| Properties | | | | | |
| $T_g$, °C | −43 | −46 | −47 | −47 | −44 |
| $T_m$, °C | 112 | 102 | 112 | 85 | 105 |

TABLE I-continued

| Formulations | I(a) | I(b) | I(c) | I(d) | I(e) |
|---|---|---|---|---|---|
| IV, dl/g*** | 0.81 | 0.80 | 0.63 | 0.85 | 0.73 |

*Weston 618 phosphite
**4,4' - thiobis - (6-tertiary butyl meta-cresol)
***in 1,1,2,2-tetrachloroethane solvent at 25°C 50 parts     copolyester
45 parts     PICCO L 60
5 parts     PICCOTEX 100

A. In this variant, the copolyester removed from the reaction vessel was remelted and blended with both resins in a stainless steel beaker at 177°C until a homogeneous solution was obtained.

B. In this variant, both resins were blended with the copolyester prior to its discharge from the reaction vessel, thus eliminating the need for remelting of the copolyester. The blended product was discharged from the reaction vessel at 177°C.

C. In this variant, the PICCOTEX 100 resin was added to the reaction vessel prior to the polycondensation (that is, added with the NIAX POLYOL), and the PICCO L 60 resin was added to the reaction vessel just prior to discharge of the copolyester. Addition of the PICCOTEX 100 increased the polycondensation time slightly (by about 2 hours), but gave a higher molecular weight product at a lower processing viscosity in the reaction vessel.

EXAMPLE III

The adhesive formulations of Example II(A) using the copolyesters of Example I(a) through (e) were tested with the results indicated in Table II.

To evaluate the copolyester-based pressure sensitive formulation, a 3.5 mils thick vinyl substrate of the type typically used on vinyl wall coverings was coated with a 0.7 mil coating of the adhesive formulation, the adhesive formulation being applied in a molten state by means of a glass draw rod. After cooling and pre-aging of the coated substrate at room temperature for 24 hours, a one inch wide strip of the coated substrate was laminated to a stainless steel testing plate. After an aging period described below, the coated substrate was peeled away from the plate at an angle of 180° and at the rate of 30 cm per minute using an Instrom Tensile Tester Model Number TTC 284. The peel strength after one-half hour of aging at room temperature was recorded as the initial peel strength, and the peel strength after aging for one week at 70°C was recorded as the aged peel strength. Any adhesive splitting or transfer was noted in either case. Shrinkage of a 13 cm by 13 cm adhesive coated specimen after one hour of aging and aging for one week at 70°C was also recorded. Melt viscosity of the formulation at 150°C was measured.

To determine the utility of the pressure sensitive adhesive formulation after storage at elevated temperature prior to use, similar tests were applied to an adhesive formulation which had been aged for 3 days at 150°C prior to delayed use, the delayed melt viscosity (at 150°C), delayed initial peel, delayed aged peel, shrinkage and color change being noted.

EXAMPLE IV

This example illustrates the preparation of two copolyesters (IV(a), IV(b)) of the present invention for non-pressure sensitive applications using the ingredient additions of Table III. The procedure utilized was identical to that of Example I, except that the dimer reaction was continued until Acid No. = 0.5 and the polycondensation period was only 2 hours.

A copolyester identical in composition to Example

TABLE II

| TESTS | FORMULATIONS | | | | |
|---|---|---|---|---|---|
| IMMEDIATE APPLICATION | I(a) | I(b) | I(c) | I(d) | I(e) |
| Initial melt viscosity, cps. | 11,500 | | | | |
| Initial peel strength, ozs./l. inch | 60 | 72 | 112 | 81 | 50 |
| Aged peel strength, oz./l. inch (7 days at 70°C) | 60 | 72 | 110 | 75 | 43 |
| Aged shrinkage, % (7 days at 70°C) | <0.1 | <0.1 | <0.1 | <0.1 | <0.1 |
| Color change | None | | | | |
| DELAYED APPLICATION (3 days at 150°C) | | | | | |
| Melt viscosity, cps. | 8,000 | | | | |
| Initial peel strength, oz./l. inch | 64 | | | | |
| Aged peel strength, oz./l. inch (7 days at 70°C) | 64 | | | | |
| Aged shrinkage, % (7 days at 70°C) | <0.1 | | | | |
| Color change | None | | | | |

IV(a), but without the polyester polyol member PCP 0300, and prepared under the same conditions has an intrinsic viscosity of 0.53 dl/g, even though polycondensation time was extended to over 4 hours and the pressure reduced to 0.8 mm Hg.

EXAMPLE V

This example illustrates the use of a copolyester of the present invention in a non-pressure sensitive adhesive formulation useful as a packaging adhesive.

50 parts Example IV(a) copolyester
30 parts Castor wax
10 parts Picco L 60
10 parts Kristalex 85
0.2 parts Irganox 1010

The above ingredients were blended at 177°C until a uniform solution was obtained. Melt viscosity at this temperature, as measured with a Brookfield Thermocel viscometer, was 3,350 cps.

To evaluate the heat resistance of the hot melt packaging adhesive formulation, two 2.5 × 7.6 cm strips of No. 40 Kraft paper are bonded together in the following manner. A 0.32 cm diameter bead of the formulation if drawn across one strip at 177°C (the hot melt temperature) to form a continuous 2.5 cm horizontal line of adhesive. The second strip is immediately placed on the molten formulation, and a 200 gram weight is placed over the sandwich thus formed until the formulation is set (about 10 seconds). The bond of the sandwich is then aged at room temperature for 24 hours prior to testing. During the test, the sandwich is used to suspend a 100 gram weight in an air circulating

TABLE III

| Formulations | IV(a) | IV(b) |
|---|---|---|
| Addition "A" | | |
| Dimethyl terephthalate | 441.0 | 497.0 |
| 1,4-butanediol | 450.0 | |
| 1,6-hexanediol | | 556 |
| Dibutytin oxide (catalyst) | 0.64 | 0.64 |
| Antimony trioxide (catalyst) | 0.26 | 0.26 |
| Antioxidant | 0.52* | 0.52* |
| Addition "B" | | |
| EMPOL 1010 dimer acid | 456 | |
| EMPOL 1014 dimer acid | | 220.5 |
| Xylene | 86.0 | 86.0 |
| Addition "C" | | |
| NIAX POLYOL PCP 0300 (triol) | 48.3 | 45.9 |
| Addition "D" | | |
| Antioxidant | 3.0* | 3.0* |
| Properties | | |
| $T_g$, °C | −43 | −29 |
| $T_m$, °C | 169 | 111 |
| IV,dl/g** | 0.83 | 0.71 |

*4,4'-thiobis-(6-tertiary butyl meta-cresol)
**in 1,1,2,2-tetrachloroethane solvent at 25°C.

oven with temperature control, the weight being attached to one strip and the other strip being suspended from the oven rack. The configuration is designed in one case to measure peel strength, and in the other case to measure sheer bond strength. After the test specimen is conditioned to the initial oven temperature of 38°C, the temperature is raised in 5.6 C° increments every 15 minutes until adhesion failure is evidenced by dropping of the weight.

To evaluate the cold resistance of the hot melt packaging adhesive formulation, two 5.1 × 7.6 cm strips of corrugated paper stock are bonded together in the following manner. A 0.32 diameter bead of the formulation is drawn across one corrugated strip at 177°C (the hot melt temperature) to form a continuous line of adhesive. The second corrugated strip is immediately placed on the molten formulation, the corrugations being placed perpendicular to each other to simulate box flap closure on a corrugated container, and a 200 gram weight is placed over the sandwich thus formed until the formulation is set (about 10 seconds). The bond of the sandwich is aged at room temperature for about 24 hours prior to testing. During the test the sandwich is first conditioned to the desired test temperature, and then the bond is tested at the test temperature by manually (and sharply) peeling apart the two corrugated strips. The bonds are rated on the percentage of corrugated fiber pull; for example, 100% pull is good, 40–60% is fair, 0–40% is poor. Failed bonds are described as "adhesive failure" when the glue cleanly comes off one surface and as "cohesive failure" when a cohesive fracture of the glue line occurs.

The formulation based on the copolyester of Example IV(a) was found to have a peel heat resistance of 49°C, a shear heat resistance of 99°C and a good cold resistance at −20°C. The excellent heat and cold resistance characteristics demonstrated indicate that the formulation will be useful as a packaging adhesive for sealing cartons, boxes, etc., and will be able to withstand the extreme temperatures frequently encountered in transporting such packages in railroad cars, ships, and the like which are not provided with temperature control.

EXAMPLE VI

This example illustrates the use of a copolyester of the present invention in a non-pressure sensitive adhesive formulation useful as an edge banding adhesive.
  50 parts Example IV(b) copolyester.
  10 parts Picco L 60
  10 parts Piccotex 100
  30 parts BaSO₄
  0.2 parts Irganoz 100

The above ingredients were blended at 177°C until a uniform solution was obtained. Melt viscosity of this product was 75,000 cps, at 177°C.

To evaluate the heat resistance of the hot melt edge banding adhesive formulation, the formulation was drawn into a 0.0254 cm thick film using a Byrd film applicator. The film strip (1.25 × 7.6 cms) is then placed on a 2.54 cm thick piece of particle board of similar size. The formulation is then reactivated using a hot air gun at 204°C. A formica strip is then placed on the molten formulation, and the whole assembly is put in a hydraulic press for 5 minutes at 400 psi. Excess formulation which flows to the edges is trimmed, and the samples are allowed to age at room temperature for 24 hours. The aged specimens are then placed in an air-circulating oven having a glass porthole for observing the bonds. After the sample is held in an oven for 30 minutes at an initial oven temperature of 38°C, the oven temperature is then raised in increments of 5.6°C every 30 minutes until bond failure, the temperature at which bond failure occurs being deemed the heat resistance temperature. Failure consists of even a slight hairline gap being formed between the formica and the particle board.

The formulation based on the copolyester of Example IV(b) was found to have a heat resistance of 71°C. This excellent heat resistance characteristic indicates that the formulation will be able to resist the high processing temperatures required for bonding decorative vinyl or formica edges on tables (typically of wood).

To summarize, the novel copolyesters are hot melt adhesives which exhibit a high degree of resistance to plasticizer migration from vinyl substrates, and in addition reduce the shrinkage of the vinyl substrates. The copolyesters may be formulated as pressure-sensitive hot melt adhesives or non-pressure sensitive hot melt adhesives useful for packaging and edge banding.

The preferred embodiments of the present invention having been described above, various modifications and improvements thereon will now become readily apparent to those skilled in the art. Accordingly, the spirit and scope of the present invention is defined not by the foregoing disclosure, but only by the appended claims.

What is claimed is:

1. A thermoplastic copolyester, characterized by a glass transition temperature less than 25°C and a melting temperature greater than 70°C, of
   A. at least one aromatic dicarboxylic acid member selected from the group consisting of a symmetrical aromatic dicarboxylic acid and the acid-functioning derivatives thereof,
   B. at least one dimer acid,
   C. at least one $C_2$—$C_{10}$ glycol, and
   D. at least one polyester polyol member selected from the group consisting of i. a polycaprolactone polyol having a molecular weight of from about 500 to about 5,000 and a functionality greater than 2, said polycaprolactone polyol being present in an amount from about 1 to about 6 mole percent of the total dicarboxylic acid members in said copolyester, and ii. a mixture of a polycaprolactone diol having a molecular weight of from about 300 to about 5,000, and a non-polymeric polyol having a functionality greater than 2, said polycaprolactone diol and said non-polymeric polyol each being present in said mixture in an amount from about 1 to about 6 mole percent of the total dicarboxylic acid members in said copolyester.

2. The copolyester of claim 1, wherein said aromatic dicarboxylic acid member is selected from the group consisting of terephthalic acid and dimethyl terephthalate.

3. The copolyester of claim 1, wherein said dimer acid is selected from the group consisting of dimerized unsaturated fatty acids, the hydrogenated derivatives thereof, and the acid-functioning derivatives of either.

4. The copolyester of claim 1, wherein said polyester polyol member is a polycaprolactone polyol having a molecular weight of from about 500 to about 2,000 and a functionality greater than 2.

5. The copolyester of claim 1, wherein said polyester polyol member is a mixture of a polycaprolactone diol having a molecular weight of from about 300 to about 2,000, and a non-polymeric polyol having a functionality greater than 2.

6. The copolyester of claim 1, wherein said glycol is selected from the group consisting of 1,4-butanediol and 1,6-hexanediol.

7. A method of preparing a thermoplastic copolyester having a glass transition temperature less than 25°C and a melting temperature greater than 70°C comprising the steps of A. forming an intermediate copolyester of at least one aromatic dicarboxylic acid member selected from the group consisting of a symmetrical aromatic dicarboxylic acid and the acid-functioning derivatives thereof, at least one dimer acid, and at least one $C_2$—$C_{10}$ glycol, and B. chain-extending said intermediate copolyester by reacting said intermediate copolyester and at least one polyester polyol member selected from the group consisting of i. a polycaprolactone polyol having a molecular weight of from about 500 to about 5,000 and a functionality greater than 2, said polycaprolactone being present in an amount from about 1 to about 6 mole percent of the total dicarboxylic acid members in said copolyester, and ii. a mixture of a polycaprolactone diol having a molecular weight of from about 300 to about 5,000, and a non-polymeric polyol having a functionality greater than 2, said polycaprolactone diol and said non-polymeric polyol each being present in said mixture in an amount from about 1 to about 6 mole percent of the total dicarboxylic acid members in said copolyester.

8. The method of claim 7, wherein said aromatic dicarboxylic acid member is selected from the group consisting of terephthalic acid and dimethyl terephthalate.

9. The method of claim 7, wherein said dimer acid is selected from the group consisting of dimerized unsaturated fatty acids, the hydrogenated derivatives therof, and the acid-functioning derivatives of either.

10. The method of claim 7, wherein said polyester polyol member is a polycaprolactone polyol having a molecular weight of from about 500 to about 2,000 and a functionality greater than 2.

11. The method of claim 7, wherein said polyester polyol member is a mixture of a polycaprolactone diol having a molecular weight of from about 300 to about 2,000, and a non-polymeric polyol having a functionality greater than 2.

12. The method of claim 7, wherein said glycol is selected from the group consisting of 1,4-butanediol and 1,6-hexanediol.

13. The method of claim 7, wherein said chain-extending reaction is conducted at 225°–270°C.

14. The method of claim 13, wherein said chain-extending reaction is conducted at a vacuum of about 1–30 mm Hg pressure for about 2–6 hours.

15. A hot melt adhesive composition comprising

I. a thermoplastic copolyester, characterized by a glass transition temperature less than 25°C and a melting temperature greater than 70°C, of A. at least one aromatic dicarboxylic acid member selected from the group consisting of a symmetrical aromatic dicarboxylic acid and the acid-functioning derivatives thereof, B. at least one dimer acid, C. at least one $C_2$—$C_{10}$ glycol, and D. at least one polyester polyol member selected from the group consisting of i. a polycaprolactone polyol having a molecular weight of from about 500 to about 5,000 and a functionality greater than 2, said polycaprolactone polyol being present in an amount from about 1 to about 6 mole percent of the total dicarboxylic acid members in said copolyester, and ii. a mixture of a polycaprolactone diol having a molecular weight of from about 300 to about 5,000, and a non-polymeric polyol having a functionality greater than 2, said polycaprolactone diol and said non-polymeric polyol each being present in said mixture in an about from about 1 to about 6 mole percent of the total dicarboxylic acid members in said copolyester, and II. a tackifying resin in an amount up to 75% by weight of the total adhesive composition including the tackifying resin.

16. The composition of claim 15, wherein said aromatic dicarboxylic acid member is selected from the group consisting of terephthalic acid and dimethyl terephthalate.

17. The composition of claim 15, wherein said dimer acid is selected from the group consisting of dimerized unsaturated fatty acids, the hydrogenated derivatives thereof, and the acid-functioning derivatives of either.

18. The composition of claim 15 wherein said polyester polyol member is a polycaprolactone polyol having a molecular weight of from about 500 to about 2,000 and a functionality greater than 2.

19. The composition of claim 15, wherein said polyester polyol member is a mixture of a polycaprolactone diol having a molecular weight of from about 300 to about 2,000, and a non-polymeric polyol having a functionality greater than 2.

20. The composition of claim 15, wherein said glycol is selected from the group consisting of 1,4-butane-diol and 1,6-hexanediol.

21. The composition of claim 15, wherein said composition contains filler in an amount up to about 50% by weight of the total adhesive composition including the filler.

22. The composition of claim 15, wherein said composition contains wax in an amount up to about 50% by weight of the total adhesive composition including the wax.

23. The composition of claim 15, wherein said composition is a pressure-sensitive hot melt adhesive composition.

* * * * *